(12) United States Patent
Maxwell

(10) Patent No.: US 7,458,602 B2
(45) Date of Patent: Dec. 2, 2008

(54) DUAL MOTORCYCLE TRAILER

(75) Inventor: Robert Maxwell, Deerfield Beach, FL (US)

(73) Assignee: Trailer In A Bag, Inc., Coral Springs, FL (US)

( * ) Notice: Subject to any disclaimer, the term of this patent is extended or adjusted under 35 U.S.C. 154(b) by 300 days.

(21) Appl. No.: 11/354,723

(22) Filed: Feb. 15, 2006

(65) Prior Publication Data

US 2006/0181064 A1 Aug. 17, 2006

Related U.S. Application Data

(60) Provisional application No. 60/653,456, filed on Feb. 16, 2005.

(51) Int. Cl.
*B62B 5/00* (2006.01)

(52) U.S. Cl. .................. 280/656; 280/785; 280/789

(58) Field of Classification Search .......... 280/656, 280/789, 785, 786, 476.1, 638, 402, 409, 280/411.1, 413

See application file for complete search history.

(56) References Cited

U.S. PATENT DOCUMENTS

| | | | | |
|---|---|---|---|---|
| 3,625,545 A | * | 12/1971 | Somers et al. ............. | 280/170 |
| 3,912,139 A | * | 10/1975 | Bowman ...................... | 410/3 |
| 4,078,821 A | * | 3/1978 | Kitterman ................. | 280/460.1 |
| D269,961 S | * | 8/1983 | Law ........................... | D12/101 |
| 4,488,735 A | * | 12/1984 | Hehr .......................... | 280/656 |
| 5,123,802 A | * | 6/1992 | Bell ............................ | 414/563 |
| 5,228,712 A | * | 7/1993 | Speier ........................ | 280/401 |
| 5,678,838 A | * | 10/1997 | Taylor ........................ | 280/413 |
| 6,287,069 B1 | * | 9/2001 | Oliphant et al. ............. | 414/426 |
| 6,428,035 B1 | * | 8/2002 | Maxwell et al. ............. | 280/656 |
| D523,779 S | * | 6/2006 | Mattila ....................... | D12/101 |

* cited by examiner

*Primary Examiner*—Christopher Ellis
*Assistant Examiner*—Brian Swenson
(74) *Attorney, Agent, or Firm*—Robert M. Downey, PA

(57) ABSTRACT

A motorcycle trailer converts between a single mode, for towing one motorcycle, and a dual mode for towing two motorcycles. In the single mode, a longitudinal frame includes a front member, a center member and a rear member which assemble to provide an elongate, narrow platform with a tire channel for receiving the front and rear wheels of a motorcycle. Left and right wheel assemblies each include a wheel with a tire, an axle and an axle extension that slides into an axle sleeve fixed to the underside of the longitudinal frame. A straight coupler is fitted to the front member for hitching the assembled trailer to a tow vehicle. In the dual mode, two assembled longitudinal frames, each having the front member, center member and rear member, are positioned in parallel spaced relation and an axle extension is connected between the axle sleeves. A Y coupler has a transverse tie member with spaced receptacles for receiving a forward tongue on each of the front members of the parallel frames, thereby providing a single coupler for hitching the assembled dual trailer to a towing vehicle with two motorcycles carried side by side on the trailer.

20 Claims, 3 Drawing Sheets

DUAL MOTORCYCLE TRAILER

BACKGROUND OF THE INVENTION

This application claims the benefit of the filing date of provisional patent application Ser. No. 60/653,456 filed on Feb. 16, 2005.

FIELD OF THE INVENTION

The present invention relates to trailers which are towed behind a vehicle and, more particularly, to a motorcycle trailer which selectively assembles in either a single mode, for towing one motorcycle and a dual mode for towing two motorcycles behind the towing vehicle.

DISCUSSION OF THE RELATED ART

In recent years, lightweight trailers capable of being disassembled and stored when not in use have become increasingly popular. Many of these trailers provide collapsible features, tilting or folding members and may be reduced to a size when disassembled, for storing in the trunk or rear cargo compartment of a vehicle. The ability to easily store the trailer also facilitates transportation because the trailer can now be placed into transport devices that were impractible to be used with a fully assembled trailer.

One problem associated with many of these storable trailers is that they require special tools to be assembled and disassembled. In the event the tools become lost, misplaced, or otherwise unavailable to the user, the trailer cannot be assembled or disassembled. Consequently, the user may not be able to collapse and store or transport the trailer as desired.

In order to overcome the numerous problems which existed in the art in connection with lightweight, portable and collapsible trailers, I previously invented a portable motorcycle trailer which is fully disclosed in U.S. Pat. No. 6,428,035 B1, the entire disclosure of which is incorporated herein by reference. While my portable motorcycle trailer, as shown and described in the above referenced patent has solved many of the problems associated with lightweight, collapsible trailers, there are times when a motorcycle rider has the need to tow two motorcycles. More specifically, on certain occasions a motorcycle rider may need to tow just a single motorcycle to a distant location and, on other occasions, the motorcycle rider may need to tow two motorcycles, such as when traveling with a companion.

Accordingly, there remains a need for a portable and collapsible motorcycle trailer which allows the user to selectively tow either a single motorcycle or two motorcycles behind a towing vehicle.

OBJECTS AND ADVANTAGES OF THE INVENTION

With the foregoing in mind, it is a primary object of the present invention to provide a motorcycle trailer which is capable of being disassembled and stored, such as in a bag or compartment, and which is capable of being transported in the luggage compartment of a passenger vehicle or the back of a pick up truck and, further wherein the trailer converts between a single mode for carrying one motorcycle and a dual mode for carrying two motorcycles.

It is a further object of the present invention to provide a motorcycle trailer which converts between a single mode and a dual mode, and wherein the motorcycle trailer can be disassembled into pieces which are small enough and light enough to be carried collectively in a carry bag or compartment which conveniently fits within the cargo compartment of a vehicle.

It is still a further object of the present invention to provide a portable and collapsible motorcycle trailer which converts between a single mode and a dual mode, and wherein the trailer is capable of being assembled and disassembled without the use of any tools.

It is still a further object of the present invention to provide a portable and collapsible motorcycle trailer which quickly and easily converts between a single mode, for carrying one motorcycle and a dual mode for carrying two motorcycles when towed behind a single towing vehicle.

These and other objects and advantages of the present invention are more readily apparent with reference to the following detailed description and accompanying drawings.

SUMMARY OF THE INVENTION

The present invention is directed to a motorcycle trailer which converts between a single mode, for towing one motorcycle, and a dual mode for towing two motorcycles. In the single mode, a support frame includes a front member, a center member and a rear member with a transverse axle support sleeve. Left and right wheel assemblies each include a wheel with a tire, an axle and an axle extension. The axle extension is adapted for sliding interlocking receipt within the axle sleeve. The combined front, center and rear members form an elongate tire channel for receiving the front and rear wheels of a motorcycle thereon. A coupler is fitted to the front member for hitching to a tow vehicle. In the dual mode, two assembled frame structures, each having the front member, center member and rear member, are positioned in parallel space relation and an axle extension is connected between the axle sleeves. A coupler has a spreader with spaced receptacles for receiving a forward tongue on each of the front members of the parallel frame structures, thereby providing a single coupler for hitching to a towing vehicle with two motorcycles carried on the trailer.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
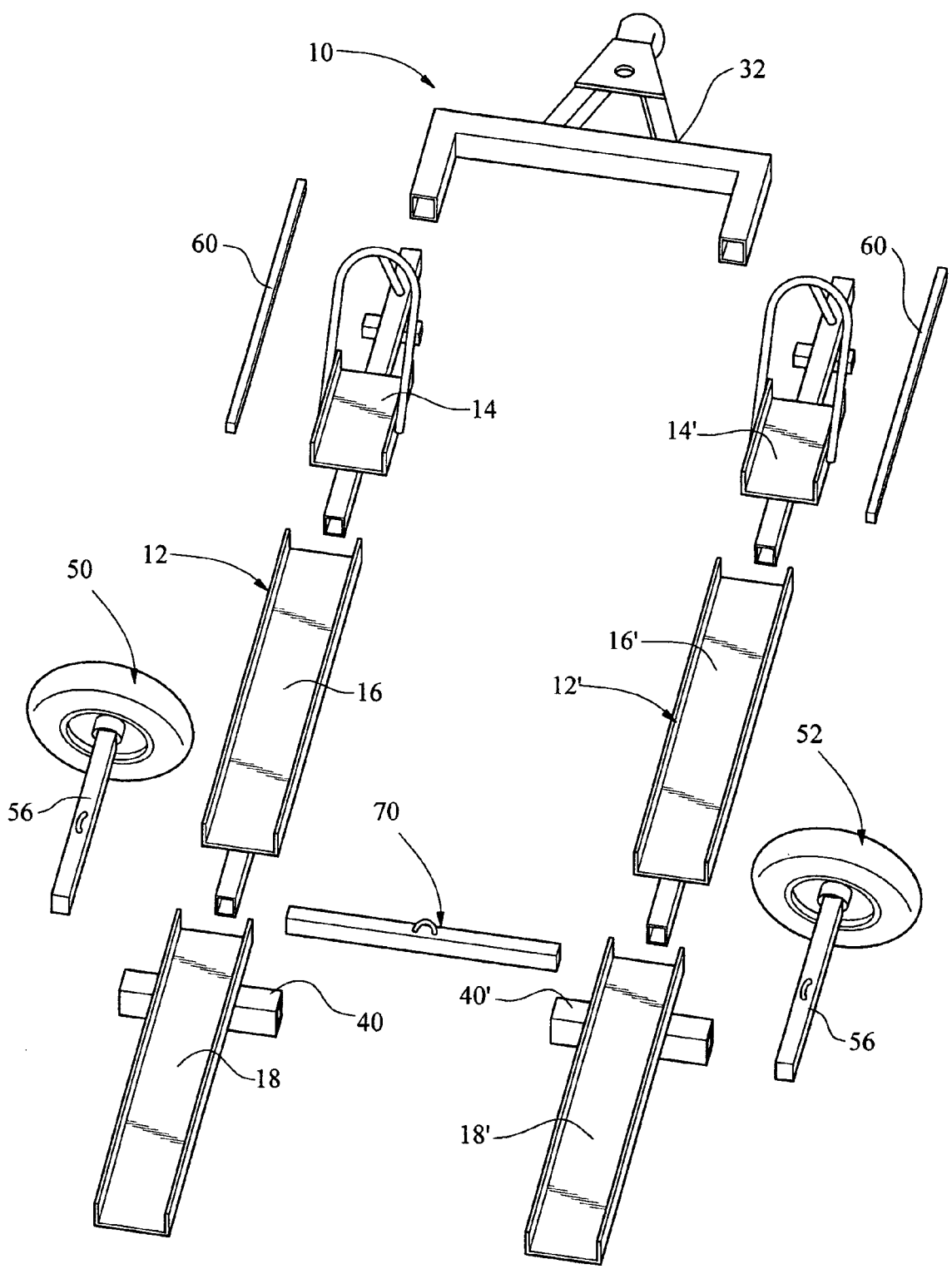
FIG. 1 is a top perspective view, shown exploded, illustrating the primary component parts of the portable motorcycle trailer of the present invention for assembly in the dual mode in order to carry two motorcycles, side by side.
Figure 2:
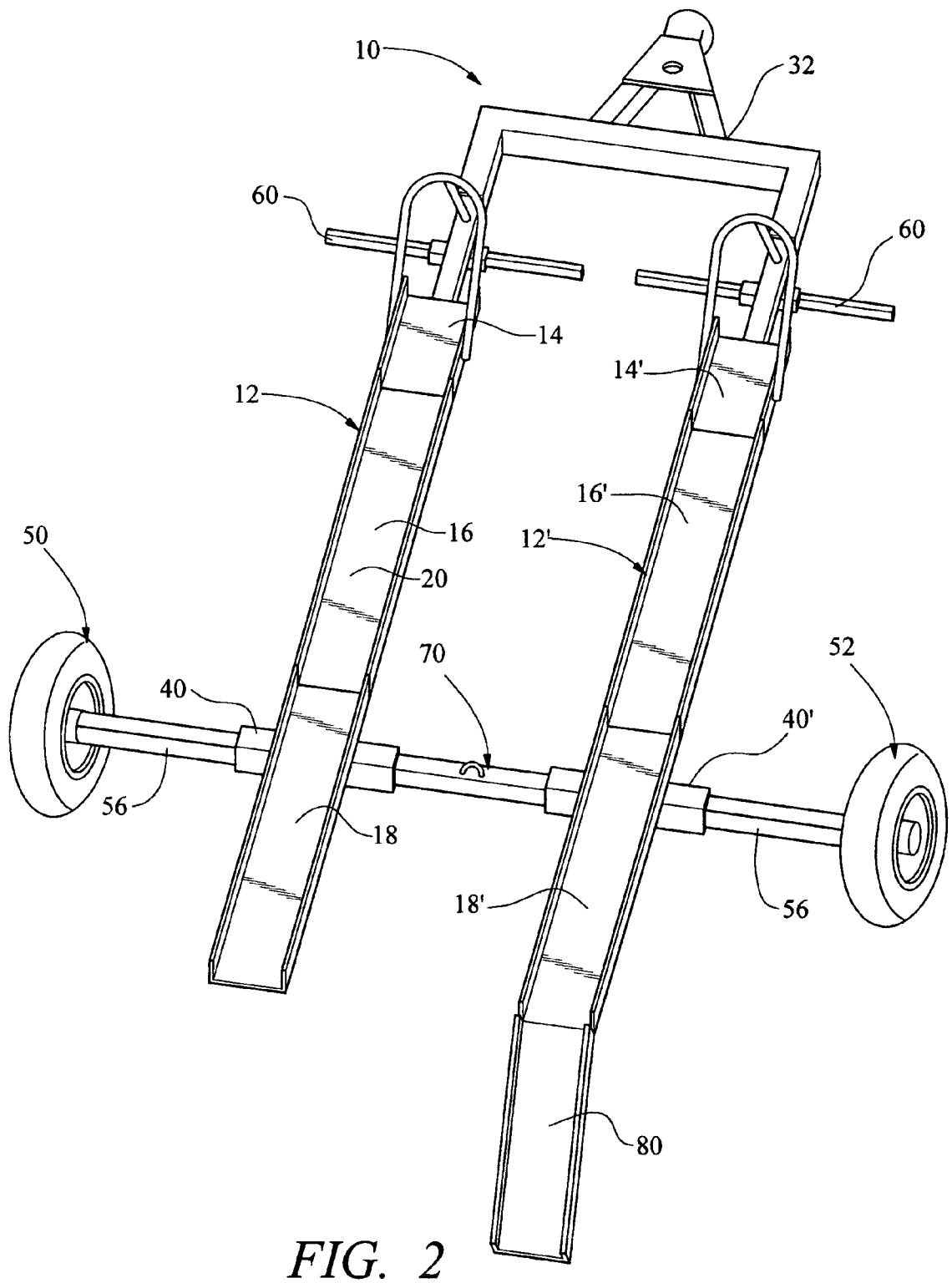
FIG. 2 is a top perspective view of the portable motorcycle trailer shown assembled in the dual mode with a removable ramp positioned at the end of the right tire channel for loading a motorcycle onto the right side of the trailer.
Figure 3:
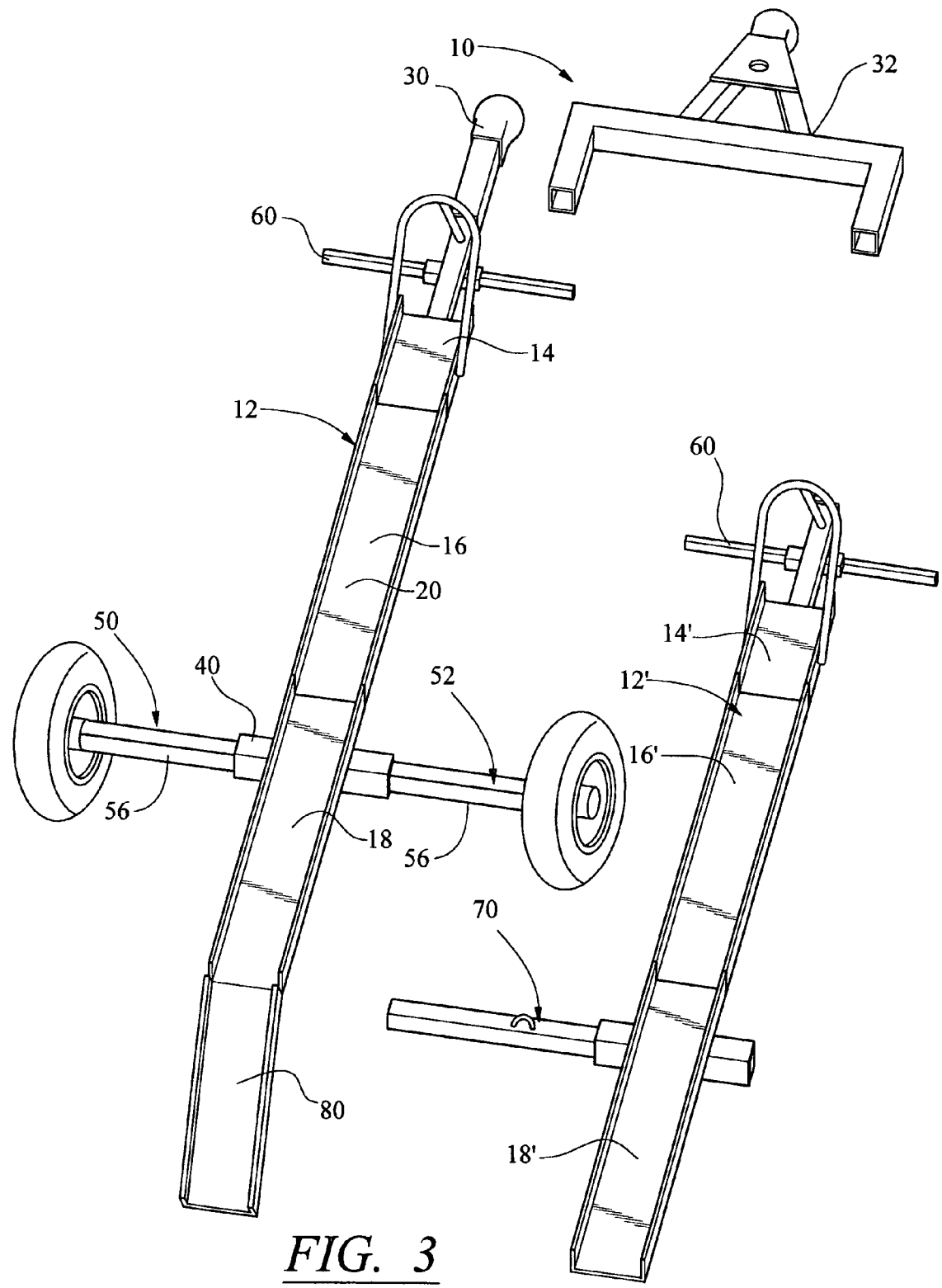
FIG. 3 is a top perspective view, shown partially exploded, with the portable motorcycle trailer assembled in the single mode and showing the right frame structure and dual coupler removed.

Referring to the several views of the drawings, the motorcycle trailer of the present invention is shown and is generally indicated as 10. As illustrated throughout the several Figures of the drawings, the motorcycle trailer is specifically adapted to convert between a single mode, as seen in FIG. 3, and a dual mode, as seen in FIG. 2.

In the single mode, the motorcycle trailer includes a longitudinal frame structure 12 having a front member 14, a center member 16 and a rear member 18. The front, center and rear members interconnect to provide an elongate, narrow platform with a tire channel 20 on the top for receiving the front and rear wheels of a motorcycle. Longitudinal sidewalls extend along the opposite sides of the top platform for maintaining the front and rear wheels of the motorcycle in supported alignment on the platform. Tongues and cooperating tongue sleeves on the undersides of the front, center and rear members facilitate assembly of the longitudinal frame structure. Specifically, a tongue extends from an underside of the front member for interlocking receipt within a tongue sleeve on the underside of the center member. Similarly, a tongue extending from the underside of the center member, at the rear end thereof, is adapted for sliding, interlocking receipt within a tongue sleeve on the underside of the rear member 18. Hardware such as pins with clips, spring loaded locking pins or bolts and nuts may be used for securing the tongues within the channels, thereby maintaining the front, center and rear members in attachment to form the longitudinal frame structure. A coupler tongue extending from the forward end of the front member is adapted for receipt of either a straight coupler 30 (for single mode trailer) or a Y-shaped dual coupler 32 (for the dual mode trailer. A transverse axle sleeve 40 is fitted to the underside of the longitudinal frame structure, and preferably the rear member 18. The transverse axle sleeve 40 is adapted for receiving left and right wheel assemblies 50, 52. Specifically, each of the wheel assemblies 50, 52 is provided with an axle extension 56 which is specifically structured and configured for sliding, interlocking receipt within the axle sleeve 40. Again, hardware such as pins and locking clips, spring loaded locking pins, or bolts and nuts may be used for securing the axle extensions 56 within the axle sleeve 40. More specifically, locking holes formed through the axle sleeve 40 align with corresponding holes formed through the axle extensions 56 of the left and right wheel assemblies for passage of the locking hardware therethrough, thereby fixidly securing the axle extensions within the axle sleeve. A tie down bar 60 extends transversely through a sleeve at the forward end of the longitudinal frame structure. The tie down bar 60 allows the motorcycle to be secured to the trailer with the use of tie down straps, rope or other securing means extending between structure on the forward end of the motorcycle and the opposite ends of the tie down bar 60.

In the dual mode, a second longitudinal frame structure 12' is assembled and joined in spaced, parallel relation to the other longitudinal frame structure 12. The second longitudinal frame structure 12' is assembled in the same manner, as described above, and includes a front member 14', a center member 16' and a rear member 18'. When assembled in the dual mode, the longitudinal frame structure 12' provides an elongate, narrow platform with a tire channel, allowing a second motorcycle to be carried on the assembled trailer 10. In converting the trailer 10 from the single mode to the dual mode, a center axle extension member 70 is fitted to the axle sleeve 40 on longitudinal frame structure 12 and axle sleeve 40' on longitudinal frame structure 12'. Thus, the center axle extension member 70 interlocks and extends between the parallel positioned longitudinal frame structures 12 and 12'. At the forward end of the trailer, the straight coupler 30 is removed and the Y-shaped dual coupler 32 is fitted to the coupler tongues at the forward ends of both longitudinal frame structures 12 and 12'. The dual coupler 32 and central axle extension member 70 serve to interlock the parallel positioned longitudinal frame structures 12 and 12', while maintaining the longitudinal frame structures in fixed, spaced relation. A ramp 80 is removably positioned at the end of either of the tire channels for loading and unloading a motorcycle onto each of the longitudinal frame structures 12 and 12'. In the dual mode, two tie down bars 60 are used, one at the forward end of each of the longitudinal frame structures, for securing the motorcycles on each of the longitudinal frame structures.

While the instant invention has been shown and described in accordance with a preferred and practical embodiment thereof, it is recognized that departures from the instant disclosure are contemplated within the spirit and scope of the present invention.

What is claimed is:

1. A motorcycle trailer for towing one or two motorcycles behind a tow vehicle comprising:

a first longitudinal frame structure with a front end and a rear end and including: a plurality of interconnecting members that assemble to form a motorcycle support platform with a longitudinal tire receiving channel;

a transverse axle sleeve fixed to an underside of said first longitudinal frame structure;

left and right wheel assemblies each including a wheel rim with a tire, an axle, and an extension for removable attachment to said transverse axle sleeve so that said left and right wheel assemblies are adapted to be removably mounted on opposite sides of said first longitudinal frame structure;

a single coupler removably attachable to the front end of said first longitudinal frame structure for hitching the first longitudinal frame structure to the tow vehicle;

a second longitudinal frame structure with a front end and a rear end, and including; a plurality of interconnecting members that assemble to form a motorcycle support platform with a longitudinal tire receiving channel;

a transverse axle sleeve fixed to an underside of said second longitudinal frame structure;

a center axle extension selectively and removably attachable to each of said transverse axle sleeves of said first and second longitudinal frame structures with said first and second longitudinal frame structures positioned in side-by-side, parallel relation to one another, and one of said left and right wheel assemblies being selectively and removably attachable to said transverse axle sleeve of said second longitudinal frame structure so that said left and right wheel assemblies are removably mounted on outboard sides of the side-by-side, parallel positioned first and second longitudinal frame structures; and a dual coupler removably attachable to the front ends of each of said first and second longitudinal frame structures when said first and second longitudinal frame structures are selectively positioned in side-by-side, parallel relation, thereby providing a dual motorcycle trailer for towing two motorcycles behind the tow vehicle.

2. The motorcycle trailer as recited in claim 1 further comprising: a ramp removably and selectively attachable to either of said rear ends of said first and second longitudinal frame structures for rolling a motorcycle onto the motorcycle support platform of the respective first and second longitudinal frame structures.

3. The motorcycle trailer as recited in claim 2 wherein said center axle extension and said dual coupler are structured for removable, interlocked attachment to said first and second longitudinal frame structures, and wherein said center axle extension and said dual coupler maintain said first and second longitudinal frame structures in the side-by-side, parallel relation to one another.

4. The motorcycle trailer as recited in claim 1 further comprising: a transverse tie-down bar removably attachable to said first longitudinal frame structure.

5. The motorcycle trailer as recited in claim 4 further comprising: a transverse tie-down bar removably attachable to said second longitudinal frame structure.

6. The motorcycle trailer as recited in claim 1, wherein the single coupler is slideably connected with the first longitudinal frame structure and fixed against rotation therewith.

7. The motorcycle, trailer as recited in claim 1, wherein the dual coupler is slideably connected with the first and second longitudinal frame structures and fixed against rotation therewith.

8. A motorcycle trailer for selectively towing one or two motorcycles behind a tow vehicle comprising:
   a first longitudinal frame structure with a front end and a rear end and including: a plurality of interconnecting members that assemble to form a motorcycle support platform with a longitudinal tire receiving channel;
   a first transverse axle sleeve fixed to an underside of said first longitudinal frame structure;
   left and right wheel assemblies each including a wheel rim with a tire, an axle, and an extension for removable attachment to said first transverse axle sleeve so that said left and right wheel assemblies are adapted to be removably mounted on opposite sides of said first longitudinal frame structure;
   a second longitudinal frame structure with a front end and a rear end, and including: a plurality of interconnecting members that assemble to form a motorcycle support platform with a longitudinal tire receiving channel;
   a second transverse axle sleeve fixed to an underside of said second longitudinal frame structure;
   a center axle extension selectively and removably attachable to each of said first and second transverse axle sleeves of said first and second longitudinal frame structures with said first and second longitudinal frame structures positioned in side-by-side, parallel relation to one another, and one of said left and right wheel assemblies being selectively and removably attachable to said second transverse axle, sleeve of said second longitudinal frame structure so that said left and right wheel assemblies are removably mounted on outboard sides of the side-by-side, parallel positioned first and second longitudinal frame structures; and
   a coupler removably attachable to at least one of said first longitudinal frame structure and said second longitudinal frame structure for hitching to the tow vehicle.

9. The motorcycle trailer as recited in claim 8, wherein the coupler is slideably connected with the at least one of the first and second longitudinal frame structures and fixed against rotation therewith.

10. The motorcycle trailer as recited in claim 8, further comprising. a dual coupler removably attachable to the front ends of each of said first and second longitudinal frame structures when said first and second longitudinal frame structures are selectively positioned in side-by-side, parallel relation, thereby providing a dual motorcycle trailer for towing two motorcycles behind the tow vehicle.

11. The motorcycle trailer as recited in claim 10, wherein the dual coupler is slideably connected with the first and second longitudinal frame structures and fixed against rotation therewith.

12. The motorcycle trailer as recited in claim 8, further comprising: a ramp removably and selectively attachable to either of said rear ends of said first and second longitudinal frame structures for rolling a motorcycle onto the motorcycle support platform of the respective first and second longitudinal frame structures.

13. The motorcycle, trailer as recited in claim 10, wherein said center axle extension and said dual coupler are structured for removable, interlocked attachment to said first and second longitudinal frame structures, and wherein said center axle extension and said dual coupler maintain said first and second longitudinal frame structures in the side-by-side, parallel relation to one another.

14. The motorcycle trailer as recited in claim 8, further comprising: a transverse tie-down bar removably attachable to said first longitudinal frame structure.

15. The motorcycle trailer as recited in claim 14, further comprising: a transverse tie-down bar removably attachable to said second longitudinal frame structure.

16. A method of selectively towing one or two motorcycles behind a tow vehicle, the method comprising:
   providing first and second longitudinal frame structures each having interconnecting members that assemble to form a motorcycle support platform with longitudinal tire receiving channels;
   providing left and right wheel assemblies each including a wheel rim with a tire, an axle, and an extension for removable attachment on opposite sides of said first longitudinal frame structure, on opposite sides of said second longitudinal frame structure, and on a single side of each of the first and second longitudinal frame structures;
   when towing one motorcycle, connecting the left and right wheel assemblies to a selected one of the first or second longitudinal frame structures and further connecting a single coupler to a front end of the selected one of the first or second longitudinal frame structures; and
   when towing two motorcycles, connecting the first and second longitudinal frame structures using a center axle extension so that said first and second longitudinal frame structures are positioned in side-by-side, parallel relation to one another, connecting the left and right wheel assemblies on outboard sides of the side-by-side, parallel positioned first and second longitudinal frame structures and further connecting a double coupler to a front end of the first and second longitudinal frame structures.

17. The method of claim 16, further comprising connecting the selected one of the first or second longitudinal frame structures with a single coupler.

18. The method of claim 17, further comprising preventing rotation of the selected one of the first or second longitudinal frame structures with respect to the single coupler.

19. The method of claim 16, further comprising connecting the first and second longitudinal frame structures with a dual coupler.

20. The method of claim 19, further comprising preventing rotation of the first and second longitudinal frame structures with respect to the dual coupler.

* * * * *